(12) United States Patent
Funnell (10) Patent No.: US 8,073,453 B2
(45) Date of Patent: Dec. 6, 2011

(54) APPARATUS AND METHOD FOR HANDLING SYSTEM INFORMATION IN MOBILE TELECOMMUNICATIONS SYSTEM USER EQUIPMENT

(75) Inventor: Nicola Funnell, Warwickshire (GB)

(73) Assignee: Research In Motion Limited, Waterloo (CA)

( * ) Notice: Subject to any disclaimer, the term of this patent is extended or adjusted under 35 U.S.C. 154(b) by 112 days.

(21) Appl. No.: 10/777,478

(22) Filed: Feb. 12, 2004

(65) Prior Publication Data

US 2005/0181801 A1    Aug. 18, 2005

(51) Int. Cl.
*H04W 72/00*  (2009.01)
*H04B 7/00*   (2006.01)
*H04B 17/00*  (2006.01)
*H04L 12/26*  (2006.01)
*H04W 4/00*   (2009.01)

(52) U.S. Cl. ............... 455/452.1; 455/451; 455/525; 455/67.11; 370/328

(58) Field of Classification Search .......... 455/451, 455/452.2, 525, 67.11, 67.13; 370/241, 328, 370/329
See application file for complete search history.

(56) References Cited

U.S. PATENT DOCUMENTS 6,765,891 B2 * 7/2004 Laitinen et al. ............ 370/331
2003/0040312 A1 * 2/2003 Tohono ..................... 455/434

OTHER PUBLICATIONS

Universal Mobile Telecommunications System (UMTS): Radio Resource Control (RRC) Protocol Specification, Dec. 2003, (3GPP TS 25.331 Version 3.17.0 Release 1999).*
Universal Mobile Telecommunications System (UMTS); Radio Resource Control (RRC) Protocol Specification Dec. 2003 XP00228864.6 (3GPP TS 25.331 version 3.17.0 Release 1999).

* cited by examiner

*Primary Examiner* — George Eng
*Assistant Examiner* — Muthuswamy Manoharan (57) ABSTRACT

Apparatus and method for handling system information in mobile telecommunications system user equipment, wherein updates are applied in a defined order. In particular, in 3G UMTS systems, when System Information Block (SIB) SIB 11 and SIB 12 are received with information elements relating to cell information list (e.g. "intra-frequency cell info list", "inter-frequency cell info list" and "Inter-RAT cell info list") then the system information associated with the system information block information element in SIB 11 is applied before the system information associated with the system information block information element in SIB 12.

6 Claims, 5 Drawing Sheets

Fig. 5

APPARATUS AND METHOD FOR HANDLING SYSTEM INFORMATION IN MOBILE TELECOMMUNICATIONS SYSTEM USER EQUIPMENT

BACKGROUND

1. Technical Field

This application relates to mobile telecommunications systems in general, having particular application in UMTS (Universal Mobile Telecommunications System) in general, and to an apparatus and method for handling system information in mobile telecommunications system user equipment.

2. Description of the Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In a typical cellular radio system, mobile user equipment (UE) communicates via a radio access radio network (RAN) to one or more core networks. User equipment (UE) comprises various types of equipment such as mobile telephones (also known as cellular or cell phones), lap tops with wireless communication capability, personal digital assistants (PDAs) etc. These may be portable, hand held, pocket sized, installed in a vehicle etc and communicate voice and/or data signals with the radio access network.

In the following, reference will be made to UMTS and to particular standards. However it should be understood that the invention is not intended to be limited to any particular mobile telecommunications system.

The radio access network covers a geographical area divided into a plurality of cell areas. Each cell area is served by at least one base station, which in UMTS may be referred to as a Node B. Each cell is identified by a unique identifier which is broadcast in the cell. The base stations communicate at radio frequencies over an air interface with the UEs within range of the base station. Several base stations may be connected to a radio network controller (RNC) which controls various activities of the base stations. The radio network controllers are typically connected to a core network.

UMTS is a third generation public land mobile telecommunication system. Various standardization bodies are known to publish and set standards for UMTS, each in their respective areas of competence. For instance, the 3GPP (Third Generation Partnership Project) has been known to publish and set standards for GSM (Global System for Mobile Communications) based UMTS, and the 3GPP2 (Third Generation Partnership Project 2) has been known to publish and set standards for CDMA (Code Division Multiple Access) based UMTS. Within the scope of a particular standardization body, specific partners publish and set standards in their respective areas.

Consider a wireless mobile device, generally referred to as user equipment (UE), that complies with the 3GPP specifications for the UMTS protocol. The 3GPP 25.331 specification, v.3.15.0, referred to herein as the 25.331 specification, addresses the subject of UMTS RRC (Radio Resource Control) protocol requirements between the UMTS Terrestrial Radio Access Network (UTRAN) and the UE.

In mobile telecommunications system, measurements are taken periodically to ensure that the mobile device is in communication with the most appropriate part of the network. The network also transmits, in either a broadcast or a dedicated fashion, system information that mobile device uses to control the communication with the network.

The system information may be transmitted as system information blocks (SIBs), each of which has a defined purpose. System information elements (IEs) are broadcast in the system information blocks. A master information block may also be implemented and may optionally also contain reference and scheduling information to one or more scheduling blocks, which give references and scheduling information for additional system information blocks. Scheduling information for a system information block may be included in either the master information block or one of the scheduling blocks.

Table 8.1.1. of the 25.331 specification provides a specification of the system information blocks transmitted by the network in a UMTS network. SIB 11 is used in Idle Mode and in connected mode when the UE is in one of the following states: CELL_FACH, CELL_PCH or URA_PCH. SIB 12 is used in connected mode when the UE is in one of the following states: CELL_FACH, CELL_PCH or URA_PCH. According to Table 8.1.1, if system information block type 12 is not broadcast in a cell, the connected mode UE shall read System information block type 11: If some of the optional IEs are not included in System information block type 12, the UE shall read the corresponding IEs in System information block type 11.

There are occasions when both SIB 11 and SIB 12 are transmitted and one SIB contains an IE that is also contained in the other SIB. For instance, in clause 8.1.1.6.11 of the 25.331 standard it is stated that, when SIB 11 is received, the UE acts upon the received IE "Intra-frequency cell info list"/ "Inter-frequency cell info list"/"Inter-RAT cell info list" as described in subclause 8.6.7.3. It is also stated in clause 8.1.1.6.11 that, if in connected mode and System Information Block type 12 is indicated as used in the cell, the UE will read and act on information sent in System Information Block type 12 as indicated in clause 8.1.1.6.12. Clause 8.1.1.6.12 then says that, when SIB 12 is received, the UE acts upon the received IE "Intra-frequency cell info list"/"Inter-frequency cell info list"/"Inter-RAT cell info list" as described in subclause 8.6.7.3.

There are thus proposed strategies for handling system information in user equipment. A number of such strategies are detailed below.

Other aspects and features of the present invention will become apparent to those ordinarily skilled in the art upon review of the following description of specific embodiments of an apparatus and method for handling system information in mobile telecommunications system user equipment.

BRIEF DESCRIPTION OF THE DRAWINGS

Embodiments of the present invention will now be described, by way of example only, with reference to the attached drawings, in which.

DETAILED DESCRIPTION OF THE DRAWINGS

A method and apparatus for handling system information in mobile telecommunications system user equipment is described. In the following description, for the purposes of explanation, numerous specific details are set forth in order to provide a thorough understanding of the present invention. It will be apparent, however, to one skilled in the art that the present invention may be practised without these specific details. In other instances, well-known structures and devices are shown in block diagram form in order to avoid unnecessarily obscuring the present invention.

The needs identified in the foregoing Background, and other needs and objects that will become apparent from the following description, are achieved by, in one aspect, a method for handling system information in mobile telecommunications system user equipment, wherein updates are applied in a defined order.

Thus there is provided a method for handling messages in a mobile telecommunications system, the system comprising a network of a plurality of cells and at least one user equipment device, the method comprising, in the user equipment device, receiving a first and a second system information block, the first system information block relating to idle and connected mode (e.g. SIB 11 of the 25.331 standard) and the second system information block relating to connected mode (e.g. SIB 12 of the 25.331 standard), each of the first and second system information blocks relating to measurement information (e.g. cell selection and reselection criteria; intra-frequency, inter-frequency, inter-RAT and traffic volume measurement information; and FACH measurement occasion information). Each system information block includes at least one system information block information element (IE) and associated system information. For any system information block information element relating to a cell information list (e.g. "intra-frequency cell info list", "inter-frequency cell info list" and "Inter-RAT cell info list") the UE determines whether the same system information block information element is included both in the first system information block (e.g. SIB 11) and the second system information block (e.g. SIB 12). When the same system information block information element relating to a cell information list is included in both the first system information block and the second system information block, the system information associated with the system information block information element in the first system information block (e.g. SIB 11) is applied before applying the system information associated with the system information block information element in the second system information block (e.g. SIB 12).

In other aspects, the invention encompasses apparatus and a computer-readable medium configured to carry out the foregoing steps. In particular, the method may be implemented in a mobile telecommunications device, with or without voice capabilities, or other electronic devices such as handheld or portable devices.

The invention will be described with reference to SIB 11 and SIB 12 of the 25.331 standard. However the invention is also applicable to information blocks that act for the same purpose and IEs that act for the same purpose (cell information list) in other telecommunications systems as may be developed and used.

Figure 1:
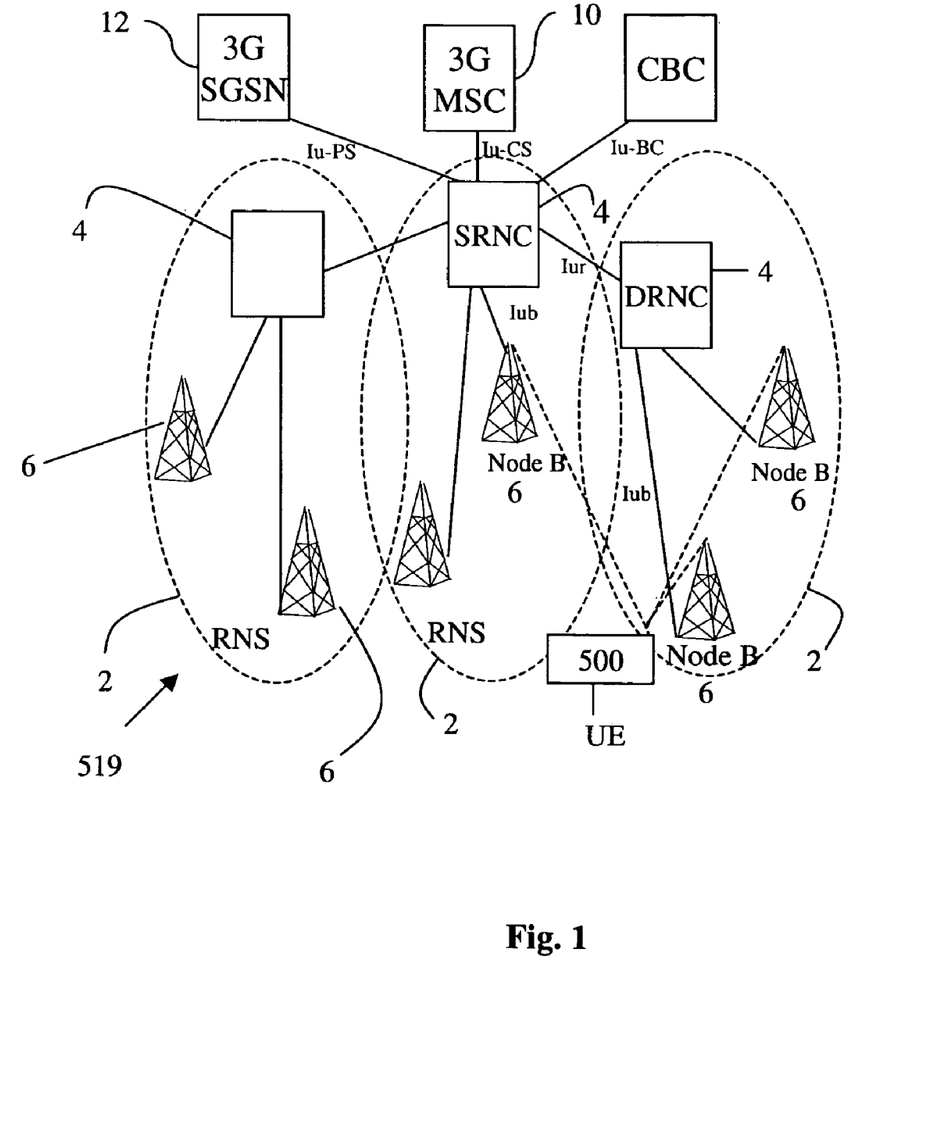
FIG. 1 shows an overview of a network and UE device.

Referring to the drawings, FIG. 1 shows an overview of a network and a UE device. Clearly in practice there may be many UE devices operating with the network but, for the sake of simplicity, FIG. 1 only shows a single UE device 500. For the purposes of illustration, FIG. 1 also shows a network 519 having a few components. It will be clear to a person skilled in the art that in practice a network will include far more components than those shown.

FIG. 1 shows an overview of the radio access network 519 (UTRAN) used in a UMTS system. The network 519 as shown in FIG. 1 comprises three Radio Network Subsystems (RNS) 2. Each RNS has a Radio Network Controller (RNC) 4. Each RNS 2 has one or more Node B 6 which are similar in function to a Base Transmitter Station of a GSM radio access network. User Equipment UE 500 may be mobile within the radio access network. Radio connections (indicated by the straight dotted lines in FIG. 1) are established between the UE and one or more of the Node Bs in the UTRAN.

The radio network controller controls the use and reliability of the radio resources within the RNS 2. Each RNC may also connected to a 3G mobile switching centre 10 (3G MSC) and a 3G serving GPRS support node 12 (3G SGSN).

An RNC 4 controls one or more Node B's. An RNC plus its Node B's together make up an RNS 2. A Node B controls one or more cells. Each cell is uniquely identified by a frequency and a primary scrambling code (primary CPICH in FDD, primary CCPCH in TDD).

Figure 2:
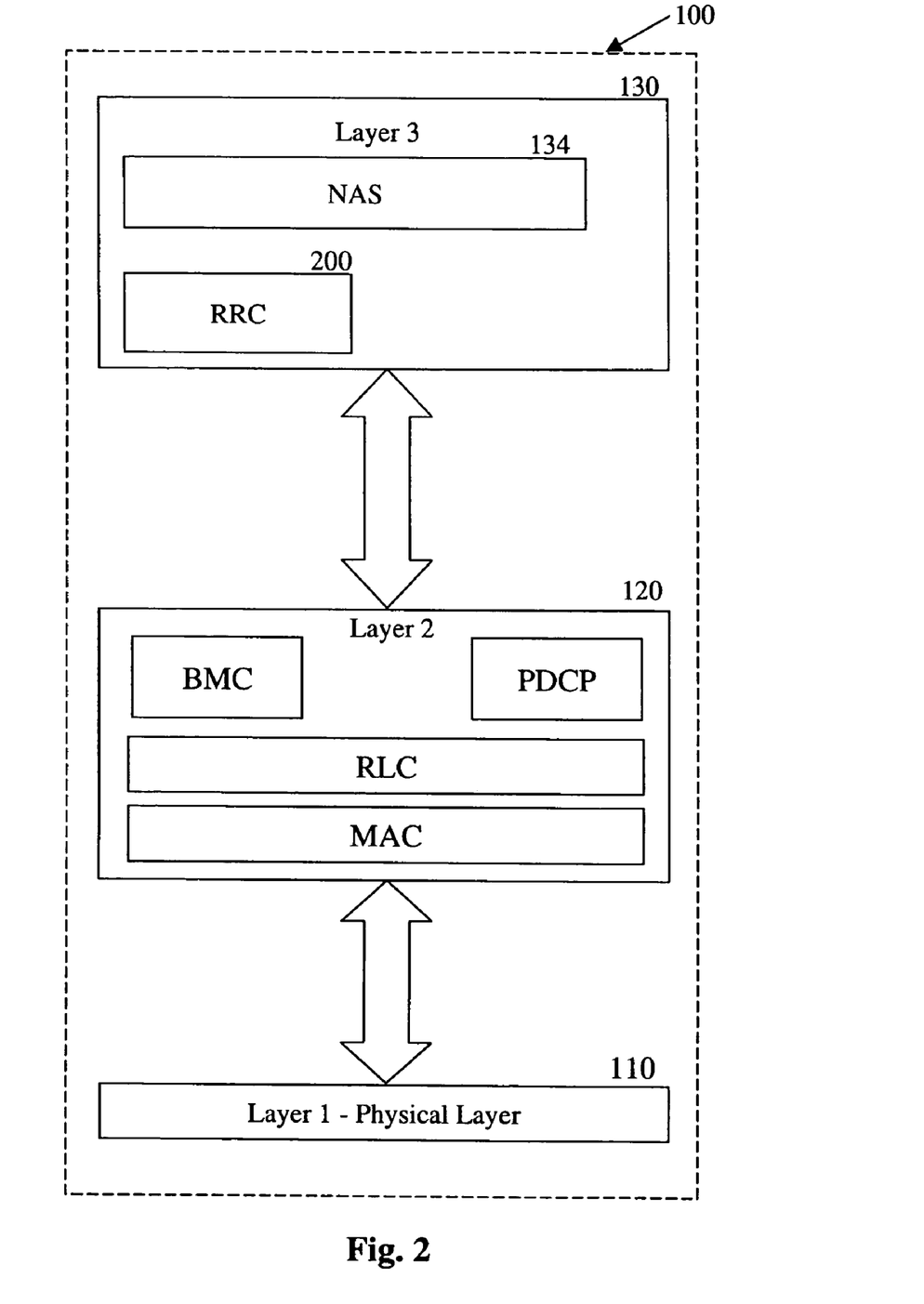
FIG. 2 is a block diagram illustrating an embodiment of a protocol stack apparatus provided with a RRC block, in accordance with the present application.

FIG. 2 is a block diagram illustrating an embodiment of a protocol stack provided in a UE. A Radio Resource Controller (RRC) block 200 is a sub layer of Layer 3 130 of a UMTS protocol stack 100. The RRC 200 exists in the control plane only and provides an information transfer service to the non-access stratum NAS 134. The RRC 200 is responsible for controlling the configuration of radio interface Layer 1 110 and Layer 2 120. The UTRAN may periodically transmit system information which the UE receives and acts upon. The system information may be broadcast on a broadcast channel e.g. BCH. The RRC 200 layer of the UE decodes this system information and initiates an appropriate RRC procedure. Generally when the procedure has been completed (either successfully or not) then the RRC sends a response message to the UTRAN (via the lower layers) informing the UTRAN of the outcome. It should be noted that there are a few scenarios where the RRC will not issue a response message to the UTRAN and, in those cases the RRC need not and does not reply.

The RRC block 200 can implement several different behaviour strategies for handling system information in mobile telecommunications system user equipment. These are summarised below, and then explained in detail subsequently, with reference to the drawings.

Clause 8.7.6.3 of the 25.331 standard relates to how information elements of the system information blocks 11 and 12 are used to update the CELL_INFO_LIST global variable. Both SIB 11 and SIB 12 may include any or all of the following IEs relating to cell information list: "intra-frequency cell info list", "inter-frequency cell info list" and "Inter-RAT cell info list". These IEs determine characteristics to be used in when the UE carries out measurements. However it is not clear in what order these IEs should be applied if included in more than one SIB.

Figure 3:
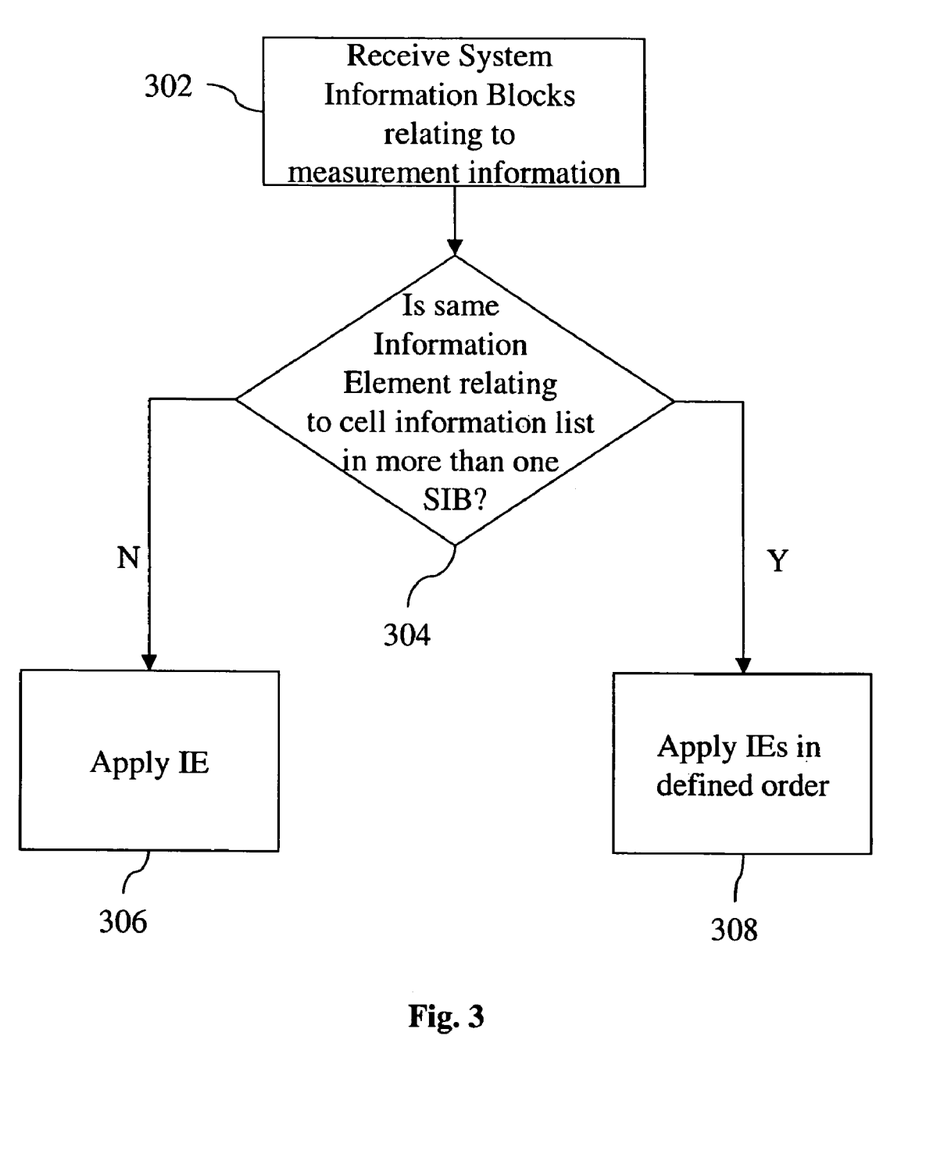
FIG. 3 is a flow chart illustrating a first embodiment.

FIG. 3 is a flow diagram illustrating a first embodiment. According to this embodiment, when more than one SIB which relates to measurement information is received, a first system information block relating to idle and connected mode and a second system information block relating to connected mode (step 302), a check is carried out to see if the same IE relating to cell information list is included in both of the SIBs, step 304. If not then the IE is applied from the associated SIB, step 306. Otherwise, the UE is arranged to apply the IE in a defined order, step 308, in which the IE from the first SIB is applied before applying the IE from the second SIB. The defined order for applying the IEs is stored in the UE.

Figure 4:
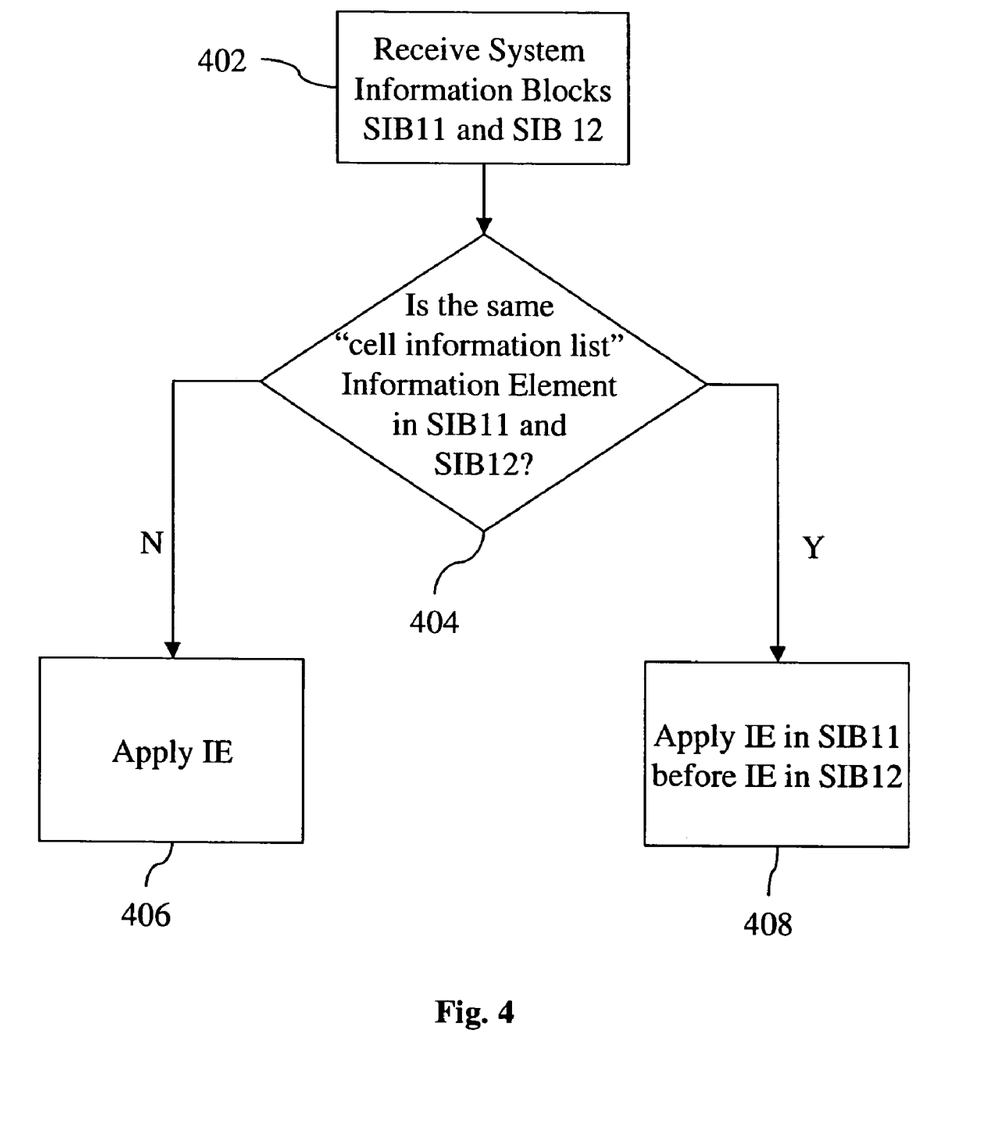
FIG. 4 is a flow chart illustrating a second embodiment.

FIG. 4 is a flow diagram illustrating a further embodiment. According to this embodiment, when SIB 11 and 12 (which both relate to measurement information, SIB 11 relating to idle and connected mode and SIB 12 relating to connected mode) are received (step 402), a check is carried out, step 404, to see if the any of the following cell information list IEs are included in both SIB11 and SIB12: "intra-frequency cell info list", "inter-frequency cell info list" and "Inter-RAT cell info list". For each cell information list information element in turn, if a cell information list information element is only included in one SIB then the IE is applied, step 406. Otherwise, for a cell information list information element that is included in both SIBs, the UE is arranged to apply the cell information list IE from SIB 11 before applying the corresponding cell information list IE from SIB 12, step 408.

Thus, for a cell information list IE that is included in both SIB 11 and SIB 12, both IEs are applied, with the IE from SIB 11 being applied before the corresponding IE from SIB 12. In particular, in 3G UMTS systems, when System Information Block (SIB) SIB 11 and SIB 12 are received with information elements relating to cell information list (e.g. "intra-frequency cell info list", "inter-frequency cell info list" and "Inter-RAT cell info list") then the system information associated with the system information block information element in SIB 11 is applied before the system information associated with the system information block information element in SIB 12.

Figure 5:
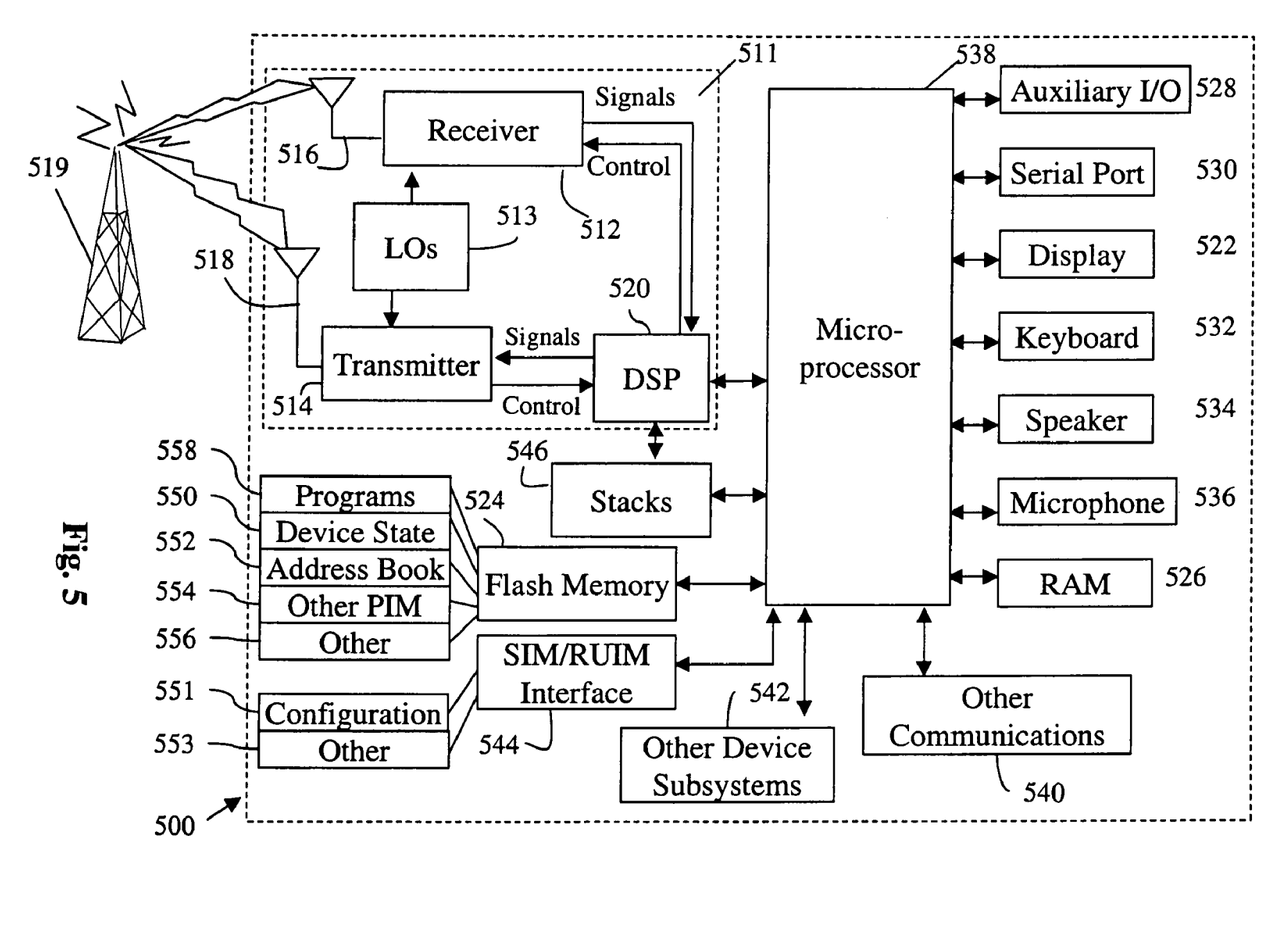
FIG. 5 is a block diagram illustrating a mobile device, which can act as a UE and co-operate with the apparatus and methods of FIGS. 1 to 4. The same reference numerals are used in different figures to denote similar elements.

Turning now to FIG. 5, FIG. 5 is a block diagram illustrating a mobile device, which can act as a UE and co-operate with the apparatus and methods of FIGS. 1 to 4, and which is an exemplary wireless communication device. Mobile station 500 is preferably a two-way wireless communication device having at least voice and data communication capabilities. Mobile station 500 preferably has the capability to communicate with other computer systems on the Internet. Depending on the exact functionality provided, the wireless device may be referred to as a data messaging device, a two-way pager, a wireless e-mail device, a cellular telephone with data messaging capabilities, a wireless Internet appliance, or a data communication device, as examples.

Where mobile station 500 is enabled for two-way communication, it will incorporate a communication subsystem 511, including both a receiver 512 and a transmitter 514, as well as associated components such as one or more, preferably embedded or internal, antenna elements 516 and 518, local oscillators (LOs) 513, and a processing module such as a digital signal processor (DSP) 520. As will be apparent to those skilled in the field of communications, the particular design of the communication subsystem 511 will be dependent upon the communication network in which the device is intended to operate. For example, mobile station 500 may include a communication subsystem 511 designed to operate within the Mobitex™ mobile communication system, the DataTAC™ mobile communication system, GPRS network, UMTS network, or EDGE network.

FIG. 2 is a block diagram illustrating an embodiment of a protocol stack provided in a UE. A Radio Resource Controller (RRC) block 200 is a 3 sub-layer of layer 130 ("Layer 3") of a UMTS protocol stack 100. The RRC 200 exists in the control plane only and provides an information transfer service to the non-access stratum NAS 134. The RRC 200 is responsible for controlling the configuration of radio interface layer 110 ("Layer 1") and layer 120 ("Layer 2"). The UTRAN may periodically transmit system information which the UE receives and acts upon. The system information may be broadcast on a broadcast channel e.g. BCH. The RRC 200 sub-layer of the UE decodes this system information and initiates an appropriate RRC procedure. Generally when the procedure has been completed (either successfully or not) then the RRC sends a response message to the UTRAN (via the lower layers) informing the UTRAN of the outcome. It should be noted that there are a few scenarios where the RRC will not issue a response message to the UTRAN and, in those cases, the RRC need not and does not reply.

When required network registration or activation procedures have been completed, mobile station 500 may send and receive communication signals over the network 502. Signals received by antenna 516 through communication network 502 are input to receiver 512, which may perform such common receiver functions as signal amplification, frequency down conversion, filtering, channel selection and the like, and in the example system shown in FIG. 5, analog to digital (A/D) conversion. A/D conversion of a received signal allows more complex communication functions such as demodulation and decoding to be performed in the DSP 520. In a similar manner, signals to be transmitted are processed, including modulation and encoding for example, by DSP 520 and input to transmitter 514 for digital to analog conversion, frequency up conversion, filtering, amplification and transmission over the communication network 502 via antenna 518. DSP 520 not only processes communication signals, but also provides for receiver and transmitter control. For example, the gains applied to communication signals in receiver 512 and transmitter 514 may be adaptively controlled through automatic gain control algorithms implemented in DSP 520.

Mobile station 500 preferably includes a microprocessor 538 which controls the overall operation of the device. Communication functions, including at least data and voice communications, are performed through communication subsystem 511. Microprocessor 538 also interacts with further device subsystems such as the display 522, flash memory 524, random access memory (RAM) 526, auxiliary input/output (I/O) subsystems 528, serial port 530, keyboard 532, speaker 534, microphone 536, a short-range communications subsystem 540 and any other device subsystems generally designated as 542.

Some of the subsystems shown in FIG. 5 perform communication-related functions, whereas other subsystems may provide "resident" or on-device functions. Notably, some subsystems, such as keyboard 532 and display 522, for example, may be used for both communication-related functions, such as entering a text message for transmission over a communication network, and device-resident functions such as a calculator or task list.

Operating system software used by the microprocessor 538 is preferably stored in a persistent store such as flash memory 524, which may instead be a read-only memory (ROM) or similar storage element (not shown). Those skilled in the art will appreciate that the operating system, specific device applications, or parts thereof, may be temporarily loaded into a volatile memory such as RAM 526. Received communication signals may also be stored in RAM 526.

As shown, flash memory 524 can be segregated into different areas for both computer programs 558 and program data storage 550, 552, 554 and 556. These different storage types indicate that each program can allocate a portion of flash memory 524 for their own data storage requirements. Microprocessor 538, in addition to its operating system functions, preferably enables execution of software applications on the mobile station. A predetermined set of applications that control basic operations, including at least data and voice communication applications for example, will normally be installed on mobile station 500 during manufacturing. A preferred software application may be a personal information manager (PIM) application having the ability to organize and manage data items relating to the user of the mobile station such as, but not limited to, e-mail, calendar events, voice mails, appointments, and task items. Naturally, one or more memory stores would be available on the mobile station to facilitate storage of PIM data items. Such PIM application would preferably have the ability to send and receive data items, via the wireless network 502. In a preferred embodiment, the PIM data items are seamlessly integrated, synchronized and updated, via the wireless network 502, with the mobile station user's corresponding data items stored or associated with a host computer system. Further applications may also be loaded onto the mobile station 500 through the network 502, an auxiliary I/O subsystem 528, serial port 530, short-range communications subsystem 540 or any other suitable subsystem 542, and installed by a user in the RAM 526 or preferably a non-volatile store (not shown) for execution by the microprocessor 538. Such flexibility in application installation increases the functionality of the device and may provide enhanced on-device functions, communication-related functions, or both. For example, secure communication applications may enable electronic commerce functions and other such financial transactions to be performed using the mobile station 500.

In a data communication mode, a received signal such as a text message or web page download will be processed by the communication subsystem 511 and input to the microprocessor 538, which preferably further processes the received signal for output to the display 522, or alternatively to an auxiliary I/O device 528. A user of mobile station 500 may also compose data items such as email messages for example, using the keyboard 532, which is preferably a complete alphanumeric keyboard or telephone-type keypad, in conjunction with the display 522 and possibly an auxiliary I/O device 528. Such composed items may then be transmitted over a communication network through the communication subsystem 511.

For voice communications, overall operation of mobile station 500 is similar, except that received signals would preferably be output to a speaker 534 and signals for transmission would be generated by a microphone 536. Alternative voice or audio I/O subsystems, such as a voice message recording subsystem, may also be implemented on mobile station 500. Although voice or audio signal output is preferably accomplished primarily through the speaker 534, display 522 may also be used to provide an indication of the identity of a calling party, the duration of a voice call, or other voice call related information for example.

Serial port 530 in FIG. 5, would normally be implemented in a personal digital assistant (PDA)-type mobile station for which synchronization with a user's desktop computer (not shown) may be desirable, but is an optional device component. Such a port 530 would enable a user to set preferences through an external device or software application and would extend the capabilities of mobile station 500 by providing for information or software downloads to mobile station 500 other than through a wireless communication network. The alternate download path may for example be used to load an encryption key onto the device through a direct and thus reliable and trusted connection to thereby enable secure device communication.

Other communications subsystems 540, such as a short-range communications subsystem, is a further optional component which may provide for communication between mobile station 500 and different systems or devices, which need not necessarily be similar devices. For example, the subsystem 540 may include an infrared device and associated circuits and components or a Bluetooth™ communication module to provide for communication with similarly enabled systems and devices.

When mobile device 500 is used as a UE, protocol stacks 546 include apparatus and a method for handling system information in mobile telecommunications system user equipment.

Extensions and Alternatives

In the foregoing specification, the invention has been described with reference to specific embodiments thereof. It will, however, be evident that various modifications and changes may be made thereto without departing from the scope of the technique. The specification and drawings are, accordingly, to be regarded in an illustrative rather than a restrictive sense.

It is to be noted that the methods as described have shown steps being carried out in a particular order. However, it would be clear to a person skilled in the art that the order of some of the steps is immaterial with respect to the operation of the method. The ordering of the steps as described herein is not intended to be limiting except where specifically stated.

It is also to be noted that where a method has been described it is also intended that protection is also sought for a device arranged to carry out the method and where features have been claimed independently of each other these may be used together with other claimed features.

The invention claimed is:

1. A method for handling system information in a user equipment device, the user equipment device configurable for use in a mobile telecommunications system, the method comprising:
   providing a predefined order for applying system information associated with system information block (SIB) information elements (IEs), the predefined order being to act on system information associated with an IE in a SIB of type 11 (SIB 11) and then to act upon system information associated with a same type of IE in a SIB of type 12 (SIB 12);
   receiving a SIB relating to measurement information of type 12 (SIB 12) which relates to connected mode and receiving a SIB relating to measurement information of type 11(SIB 11) which relates to idle and connected mode, at least one of the SIBs including an SIB IE, each IE related to a cell information list and having associated system information;
   determining thereafter if a same IE type is included in each of the SIB 11 and the SIB 12; and thereafter:
      responding to a determination that the same IE type is included in only one of the SIBs by applying an IE from the associated one of the SIBs; and
      responding to a determination that the same IE type is included by acting upon the system information associated with the identified same IE types according to the predefined order.

2. A method according to claim 1 wherein the SIB IE is selected from the following SIB IEs: an IE related to an intra-frequency cell information list, an IE related to an inter-frequency cell information list and an IE related to an inter-Radio Access neTwork (RAT) cell information list.

3. A method according to claim 1 wherein the SIB IE is any of the following: "intra-frequency cell info list", "inter-frequency cell info list" and "Inter-RAT cell info list".

4. A method for handling system information in a user equipment device, the device enable for use in a UMTS mobile telecommunications system, the system comprising a network of a plurality of cells:
   providing a predefined order for applying system information associated with system information block (SIB)

information elements (IEs), the predefined order being to act on system information associated with an IE in a SIB of type II (SIB 11) and then to act upon system information associated with a same type of IE in a SIB of type 12 (SIB 12);

receiving a system information of type SIB 12 and of a system information of type SIB 11;

determining thereafter if each of the SIB 11 and the SIB 12 includes a same one or more IEs relating to any of "intra-frequency cell info list", "inter-frequency cell info list" and "Inter-RAT cell info list"; and thereafter:

responding to a determination that the same IE type is included in only one of the SIBs, by applying an IE from the associated one of the SIBs; and responding to a determination that each of the SIB 11 and SIB 12 includes the same IEs by acting upon the system information associated with the SIB IE in SIB 11 and then applying the system information associated with the corresponding SIB IE in SIB 12, according to the predefined order.

5. A user equipment device (UE) configurable for use in a mobile telecommunications system, the UE comprising:

a microprocessor operably connected to memory, the memory comprising software disposed therein, the software configured to be run by the microprocessor, where the microprocessor running the software is configured to carry out at least the following operations:

providing a predefined order for applying system information associated with system information block (SIB) information elements (IEs), the predefined order being to act on system information associated with an IE in a SIB of type II (SIB 11) and then to act upon system information associated with a same type of IE in a SIB of type 12 (SIB 12);

receiving a SIB relating to measurement information of type 11 (SIB 11) which relates to idle and connected mode and receiving a SIB relating to measurement information of type 12 (SIB 12) which relates to connected mode, at least one of the SIBs including an SIB IE, each IE related to a cell information list and having associated system information;

determining thereafter if a same IE type is included in each of the SIB 11 and the SIB 12;

responding to a determination that the same IE type is included in only one of the SIBs by applying an IE from the associated one of the SIBs; and thereafter responding to a determination that the same IE type is included by acting upon the system information associated with the identified same IE types according to the predefined order.

6. The device of claim 5 where the same cell information list IE is related to one of: "intra-frequency cell info list", "inter-frequency cell info list" and "Inter-RAT cell info list".

* * * * *